United States Patent [19]

Hamlen et al.

[11] Patent Number: 4,745,529
[45] Date of Patent: May 17, 1988

[54] BATTERY POWERED LIGHT SOURCE

[75] Inventors: Robert P. Hamlen, Bernardsville; Thomas J. Zoltner, Denville; William Kobasz, Edison, all of N.J.; Michael V. Rose, Pittsburgh, Pa.

[73] Assignee: Alupower, Inc., Bernardsville, N.J.

[21] Appl. No.: 915,815

[22] Filed: Oct. 6, 1986

[51] Int. Cl.$^4$ .............................................. H01M 6/34
[52] U.S. Cl. ................................... 362/157; 429/118; 429/119; 429/28
[58] Field of Search ................... 429/118, 119, 27–29; 362/157, 194

[56] References Cited

U.S. PATENT DOCUMENTS

| | | | |
|---|---|---|---|
| 3,539,396 | 11/1970 | Wagner | 429/28 |
| 4,338,384 | 7/1982 | Rouge | 429/19 |
| 4,626,482 | 12/1986 | Hamlen et al. | 429/27 |

Primary Examiner—Carroll B. Dority, Jr.
Attorney, Agent, or Firm—Cooper, Dunham, Griffin & Moran

[57] ABSTRACT

A battery powered light source comprising an electric light bulb; a plurality of air cathodes; a plurality of metal anodes, one for each cathode; a plurality of electrically nonconductive housings disposed adjacent to each other, wherein each housing encloses a respective chamber containing one cathode and one anode which are spaced from each other and form an anode-cathode pair and also encloses a cavity which is below the anode-cathode pair and is in fluid flow communication with the chamber, each housing having a portion defining at least one air passage from its chamber to an adjacent housing, and an opening through which a surface of the contained cathode is exposed to air in the passage. The housings are secured to each other in such arrangement that their respective air-passage-defining portions cooperatively define at least one common air passage. Circuit elements are provided for electrically connecting the anode-cathode pairs to each other and to the electric light bulb.

15 Claims, 2 Drawing Sheets

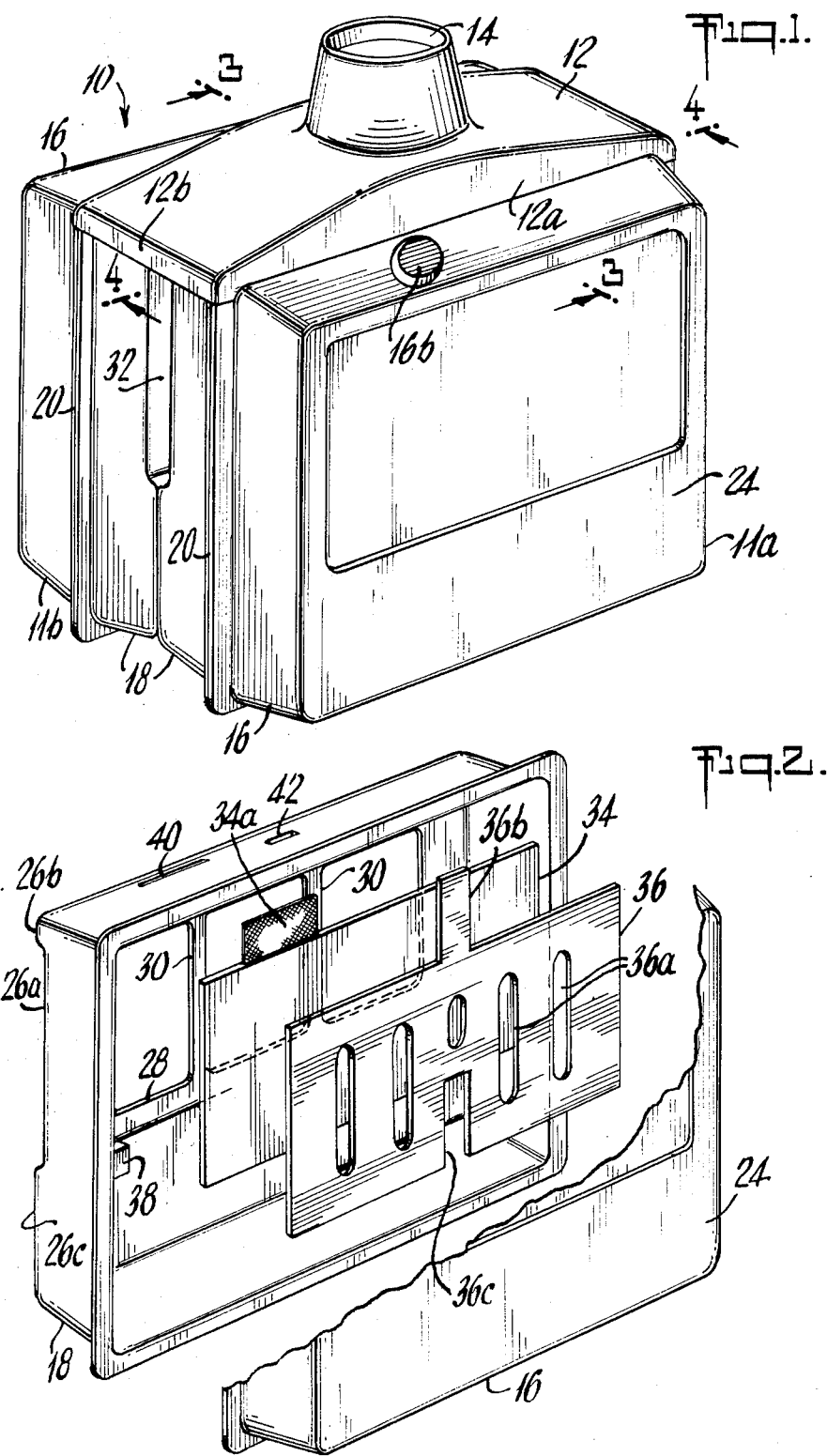

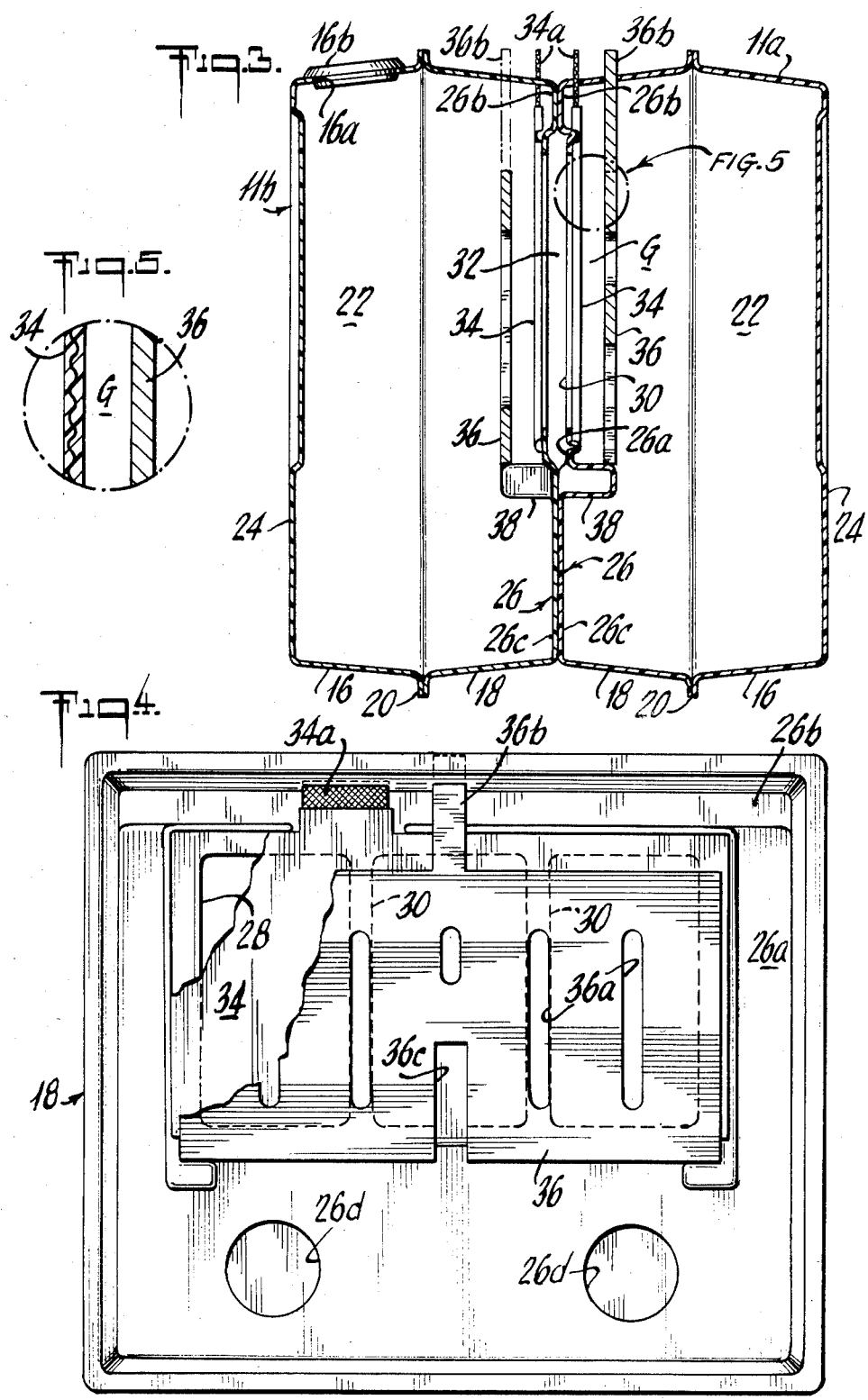

BATTERY POWERED LIGHT SOURCE

BACKGROUND OF THE INVENTION

The invention relates to a battery powered light source and to applications thereof. Our invention is useful as an inexpensive and convenient means for providing light for an extended period of time. It is useful, for example, on barges in the shipping industry. Battery powered light sources of the present invention can power a light bulb that emits light in accordance with the United States Coast Guard regulations for a period of about 28 days.

Metal/air batteries produce electricity by the electrochemical coupling of a reactive metallic anode to an air cathode through a suitable electrolyte in a cell. As is well known in the art, an air cathode is a typically sheetlike member, having opposite surfaces respectively exposed to the atmosphere and to the aqueous electrolyte of the cell, in which (during cell operation) atmospheric oxygen dissociates while metal of the anode oxidizes, providing a usable electric current flow through external circuitry connected between the anode and cathode. The air cathode must be permeable to air but substantially hydrophobic (so that aqueous electrolyte will not seep or leak through it), and must incorporate an electrically conductive element to which the external circuitry can be connected; for instance, in presentday commercial practice, the air cathode is commonly constituted of active carbon (with or without an added dissociation-promoting catalyst) containing a finely divided hydrophobic polymeric material and incorporating a metal screen as the conductive element. A variety of anode metals have been used or proposed; among them, alloys of aluminum and alloys of magnesium are considered especially advantageous for particular applications, owing to their low cost, light weight, and ability to function as anodes in metal/air batteries using neutral electrolytes such as sea water or other aqueous saline solutions.

Thus, by way of more specific example, an illustrative aluminum/air cell comprises a body of aqueous saline electrolyte, a sheetlike air cathode having one surface exposed to the electrolyte and the other surface exposed to air, and an aluminum alloy anode member (e.g. a flat plate) immersed in the electrolyte in facing spaced relation to the first-mentioned cathode surface. The discharge reaction for this cell may be written

$$4Al + 3O_2 + 6H_2O = 4Al(OH)_3.$$

As the reaction proceeds, copious production of the aluminum hydroxide reaction product (initially having a gel-like consistency) in the space between anode and cathode ultimately interferes with cell operation, necessitating periodic cleaning and electrolyte replacement. The cell may be recharged mechanically by replacing the aluminum anode when substantial anode metal has been consumed in the cell reaction.

Metal/air batteries have an essentially infinite shelf-storage life so long as they are not activated with electrolyte, making them very suitable for standby or emergency uses. For example, an emergency lamp or lantern can be constructed with a metal/air battery such as an aluminum/air battery, and a separate container of electrolyte can be stored with the battery, or be readily available within its intended environment of use. When a need for use of an emergency light arises, a user can merely activate the metal-air battery (by simply adding electrolyte) and be provided with useful light.

As any consumer can appreciate, a lantern with an infinite storage life is much more reliable than common dry-cell battery-powered lanterns that have batteries which tend to deteriorate with shelf storage. Reaching for a dry-cell-powered lantern in an emergency, only to find that the batteries have deteriorated to a discharged condition, is a frustration experienced by many people. A metal/air-battery-powered lantern avoids such a problem, because the cells cannot be depleted until the battery is filled with electrolyte.

The voltage of a single metal/air cell such as a magnesium or aluminum air cell is or may be less than that required for a lantern or other use. In such case, as well as for other purposes, a plurality (typically two) of the cells may be connected in series. Desirable characteristics of a plural-cell metal/air battery include structural simplicity and compactness, ease of activation (bringing the electrodes into contact with electrolyte) by an unskilled user, and avoidance of current paths through the electrolyte between electrodes of like polarity in different cells.

The provision of a metal/air battery-powered lantern for emergency situations is proposed in Watakabe, "Magnesium-Air Sea Water Primary Batteries," *Solar Cells*, Vol. II (Cleveland: JEC Press Inc., 1979). This publication shows a "life-torch" with a series-connected twin cell battery of "inside-out" construction, namely a pair of spaced-apart magnesium anodes having a pair of cathodes interposed between them and mutually defining a common air space. Each anode-cathode pair is surrounded by a separate electrolyte space (within a housing) to prevent or minimize electrolytic shunting between the battery cells. As those skilled in the art can appreciate, since the anodes of a pair of series-connected metal-air battery cells are at different potentials, the existence of a current path through the electrolyte between the anodes of the respective cells will cause undesired shunting of current and can significantly impair cell efficiency.

The above-cited publication contemplates use of the described device at sea, attached to a life jacket so that the battery floats substantially immersed in sea water, which enters inlets formed in the housing, one for each cell, separately filling each of the two electrolyte spaces. These inlets are widely spaced apart to reduce electrolytic shunting through the ambient sea. Such a battery uses the sea as the saline electrolyte for the battery and isolates this electrolyte into two separate tanks, one for each battery cell. Thus, to activate the described battery, one need only insert the lantern into the sea.

On land, utilization of a battery constructed in accordance with the above-cited publication would require pouring saline electrolyte into each of the battery inlets. As one can appreciate, the pouring of electrolyte into separate inlet ports can be extremely difficult, especially in the dark. An easier method of filling electrolyte into the batteries is desirable for land applications. Moreover, the device of the above-cited publication is evidently designed for a single use in a marine emergency; for a routine consumer land application, such as during power failure emergencies or extremely inclement weather, it would be desirable to have a battery that could be repeatedly activated by pouring electrolyte into the cells, and repeatedly deactivated by removing the electrolyte from the cells and cleaning out reaction products formed within the cells, without the hindrance of separate tanks for the two cells.

Also, it would be desirable to retard the accumulation of reaction product in the anode-cathode gap of a metal-/air cell or battery, such as an aluminum/air battery, thereby to prolong the period of active use of the cell or battery between cleanings. In this regard, it has heretofore been proposed to provide a relatively wide anode-cathode gap for promoting flow of fresh electrolyte around the gap edges, generally parallel to the electrode surfaces; but cell efficiency decreases with increasing anode-cathode distances. Another proposal, set forth in the *Handbook of Batteries and Fuel Cells* (McGraw-Hill, 1984), p. 30-11, is to prevent hydroxide gel formation by employing a caustic electrolyte rather than a neutral saline electrolyte, but caustic electrolytes are disadvantageous (as compared to saline electrolyte) from the standpoint of convenience, cost, and safety in handling.

Hamlen et al., U.S. Ser. No. 798,988, filed Nov. 18, 1985, allowed June 9, 1986, now U.S. Pat. No. 4,626,482, disclose a metal/air battery having plural series-connected cells, including a tank for holding a body of liquid electrolyte, and an electrically nonconductive frame carrying a plurality of air cathodes facing a common air chamber and a like plurality of metal anodes respectively juxtaposed to the cathodes outside the air chamber, the frame being removably insertable in the tank and engaging the tank wall, when inserted, so as to divide the tank into a plurality of separate and substantially electrically isolated electrolyte-holding zones each containing one anode-cathode pair.

The present invention, in an important specific sense, provides a battery-powered light source that is particularly useful on barges in the shipping industry. In order to conform to United States Coast Guard regulations, for marking barges at night, barges must have light sources that emit light of at least 0.9 candela to a distance of one mile. It is current industry practice to power lights with dry cell batteries which after a few nights are incapable of powering a light bulb. Depleted dry cell batteries are discarded each night or every other night and replaced with new dry cell batteries. Dry cell batteries are also inconvenient in that they often contain mercury which produces a toxic reaction product and have a short shelf-life as compared to the battery of the present invention. Batteries of the present invention are desirable because they overcome the deficiencies of dry cell batteries currently used on barges in the shipping industry.

SUMMARY OF THE INVENTION

In a broad sense, the present invention contemplates the provision of a battery powered light source comprising a plurality of air cathodes; a plurality of metal anodes, one for each cathode; a plurality of electrically nonconductive housings disposed adjacent to each other, wherein each housing encloses a respective chamber containing one cathode and one anode which are spaced from each other and form an anode-cathode pair and also encloses a cavity which is below the anode-cathode pair and is in fluid flow communication with the chamber, and each housing has means defining at least one air passage from its chamber to the chamber of an adjacent housing; means to attach the housings to each other and to thereby connect the air passages into at least one common air passage, the housings having openings through which surfaces of their respectively contained cathodes are exposed to air in said passage; and circuit means for electrically connecting the anode-cathode pairs to each other.

In one embodiment of the present invention, the battery powered light source additionally comprises an electric light bulb which is electrically connected by circuit means to the anode-cathode pairs. In another embodiment of the present invention, the plurality of air cathodes is two, the plurality of metal anodes is two, the plurality of electrically nonconductive housings disposed adjacent to each other is two, and the battery powered light source additionally comprises an electric light bulb which is electrically connected by circuit means to the anode-cathode pairs.

Further features and advantages of the invention will be apparent from the detailed description hereinbelow set forth, together with the accompanying drawings.

BRIEF DESCRIPTION OF THE DRAWINGS

FIG. 1 is a perspective view of a barge light device embodying the present invention in a particular form;

FIG. 2 is an exploded perspective view, partly broken away, of one cell of the device of FIG. 1;

FIG. 3 is an enlarged sectional elevational view taken along the line 3—3 of FIG. 1;

FIG. 4 is a similarly enlarged elevational view of the interior of one cell, taken along the line 4—4 of FIG. 1; and FIG. 5 is a further enlarged detail sectional view of the region enclosed by broken-line circle 5 in FIG. 3.

DETAILED DESCRIPTION OF THE INVENTION

The present invention is a battery powered light source comprising a plurality of air cathodes formed using a plurality of porous carbon plates; a plurality of metal anodes, one for each cathode, wherein said metal anodes are aluminum, magnesium or a metal alloy containing suitable amounts of aluminum, magnesium or mixtures thereof; a plurality of electrically nonconductive housings disposed adjacent to each other, wherein each housing encloses a respective chamber containing one cathode and one anode which are spaced from each other and form an anode-cathode pair and also encloses a cavity which is below the anode-cathode pair and is in fluid flow communication with the chamber, and each housing has chamber to the chamber of an adjacent housing; means to attach the housings to each other and to thereby connect the air passages into at least one common air passage; and circuit means for electrically connecting the anode-cathode pairs to each other.

In one embodiment of the present invention, the battery powered light source additionally comprises an electric light bulb which is electrically connected by circuit means to the anode-cathode pairs. In another embodiment of the present invention, the plurality of air cathodes is two, the plurality of metal anodes is two, the plurality of electrically nonconductive housings disposed adjacent to each other is two, and the battery powered light source additionally comprises an electric light bulb which is electrically connected by circuit means to the anode-cathode pairs.

The bulb may be any one of a variety of light bulbs which is capable of emitting light. For example, the bulb may be a fluorescent, strobe, incandescent, or common flash light bulb. In a preferred embodiment of the present invention, the bulb is capable of emitting light of at least 0.9 candela to a distance of one mile, which is the intensity of light required by United States Coast Guard regulations to be emitted for marking barges at night. A preferred embodiment of the present invention contemplates a cover surrounding the bulb to direct light from the light source in a generally horizontal direction. The cover functions in a manner such that light emitted from a bulb that emits a total intensity of light less than 0.9 candela is directed in a generally horizontal direction so that the bulb, when viewed from that direction appears to be emitting an intensity of light of at least 0.9 candela.

In a preferred embodiment of the present invention, the metal anode is aluminum. Aluminum is conveniently light-weight and inexpensive. It has an indefinite shelf-life and efficiently reacts with oxygen to produce electricity. The metal may also be magnesium, or an alloy containing suitable amounts of aluminum, magnesium or mixtures thereof. Zinc is not a suitable metal for the present invention because dangerous caustic electrolyte is necessary to promote an efficient electrochemical reaction. The anode preferably has vertical slots which are effective in promoting egress of reaction product from, and sufficient electrolyte flow into and through, the gap or space between the anode and cathode to retard accumulation of reaction products therein. The anode may be separated from the cathode by a distance of about one-sixteenth inch to about two inches apart. A preferred distance is about one-sixteenth inch to about three-eighths inch, more preferably about one-eighth inch to about three-eights inch, and a most preferred distance is about one-eighth inch to about one-fourth inch, for advantageous efficiency without undue shortening of useful operating time because of accumulation of electrochemical reaction product. In a preferred embodiment, the anode plate is shaped so that scrap is minimized when the anode plate is cut. In a preferred embodiment, the anode weighs about one-half pound. The anode plate is essentially a rectangular shape with a narrow arm extended from one long side of the rectangle, and an indentation, similar in shape to the narrow arm, opposing the narrow arm and indenting the anode plate from the opposite long side.

The cavity positioned below the anode-cathode pair has sufficient capacity to contain electrochemical reaction product generated during battery use. By removing the reaction product from the area surrounding the anode-cathode pair, internal resistance is minimized and the electrochemical reaction proceeds efficiently. The presence of the cavity allows batteries of the present invention to have extended reaction activity.

The battery powered light source is activated by filling each chamber to a suitable level with a saline solution or other aqueous electrolyte. Liquid electrolyte useful in the present invention may be any one of those electrolytes commonly used in batteries. The liquid electrolyte is water containing an additive to enhance electrical conductivity. The additive may be sodium chloride, potassium chloride, ammonium chloride, sodium hydroxide, potassium hydroxide or ammonium hydroxide. Sodium chloride is preferred because it is relatively convenient and inexpensive.

Each housing of the present invention has a vertical wall having an interior side facing the chamber. The source includes means to support each anode in its respective chamber comprising one or more platforms which project from the interior side of the vertical wall of the housing and form flat horizontal surfaces on which the anode rests. An activated carbon plate is glued to the interior side of the vertical wall to form the cathode. Each housing comprises two electrically non-conductive shells having vertical edges joined to form a vertical seam. Joining shells to form a vertical seam is an efficient, cost-effective manner of constructing the housing. Use of expensive large-cavity molds is not necessary when the housing is constructed by joining edges of two shells formed from shallow molds.

In a preferred embodiment of the present invention, the battery powered light source has means to control air flow into the common air passage or passages. Control of air flow is important in minimizing water evaporation which might reduce the extent of the electrochemical reaction and hence the life of the battery.

In another embodiment of the present invention, the battery powered light source has means to alternately halt and recommence the electrochemical reaction. Thus, the life of a battery of the present invention having anode, cathode, and electrolyte to provide power sufficient to emit light of an intensity of 0.9 candela to a distance of one mile from a light bulb continuously for about 28 days may be extended if said battery powered light source has means to alternately halt and recommence the electrochemical reaction. The means may be a switch such as a manual switch or a solar switch.

Referring to the drawings, the invention is illustrated as embodied in a barge light device 10 comprising two essentially identical metal/air cells 11a and 11b and a cap member 12 shaped to provide a seat 14 for mounting an electrically energizable light source (not shown), e.g. an incandescent or other lamp, in a position such that the lamp projects above the cap member. The two cells and the cap are suitably glued or otherwise bonded together to constitute an effectively unitary structure.

Each cell has a housing constituted of two facing, pan-shaped, molded plastic elements 16 and 18 glued or otherwise bonded together at their facing rims in a continuous sealed joint or seam 20 so as cooperatively to define a generally rectangular chamber 22 for holding a liquid electrolyte. The elements 16 and 18 respectively have major vertical walls 24 and 26, each extending from top to bottom and from end to end of the cell, disposed in generally parallel, spaced relation to each other, thereby to serve respectively as the outer and inner walls of the cell. Wall 26 is formed with an upper portion 26a having a large rectangular opening 28 across which extend a plurality of mullions 30; this portion 26a is recessed, from end to end of the cell, with respect to the wall portions 26b and 26c respectively above and below it. In the assembled device 10, the walls 26 of the two cells 11a and 11b are adhered together in facing contiguous relation to each other with their respective recessed portions 26a in register, forming a common laterally confined air passage 32 extending horizonally between, and open at each end of, the cells.

The wall portion 26c of each cell may be formed with a horizontally spaced pair of respectively convex and concave dimples 26d for mating with the corresponding dimples of the other cell to facilitate assembly of the device. At the top of each cell housing element 16 there is provided a port 16a, closed by a plug 16b, for introduction of liquid electrolyte to the chamber 22; the plug may have a perforation or other vent opening (not shown) for release of gas generated by electrolytic reaction within the cell.

Within the element 18 of each cell 11a or 11b, an air cathode 34 and a suitable metal (e.g. aluminum or aluminum alloy) anode 36 are disposed in facing, parallel, more or less closely spaced relation to each other (so as to define an anode-cathode gap G between them) with their facing surfaces exposed for contact with liquid electrolyte (not shown) in the chamber 22 of the cell. The air cathode is conveniently a generally rectangular sheet member fabricated of activated carbon, incorporating an electrically conductive material such as wire mesh; it is dimensioned and positioned to extend entirely over the opening 28 with its edges sealingly adhered to the interior surface of wall 26 all around the periphery of the latter opening so as to complete the liquid-tight enclosure of chamber 22, being supported externally by the mullions 30. Thus, while one major surface of the air cathode is exposed to liquid electrolyte within the cell, the other major surface of the air cathode is exposed (through the opening 28) to air in the air passage 32. The metal anode is a flat, generally rectangular metal plate of substantial thickness having a plurality of elongated vertical slots 36a opening through its major surfaces, and is supported at its lower edge on (and adhered to) a horizontally spaced pair of luglike projections 38 molded in the wall 26.

At its top edge, the air cathode 34 has a vertically extending tab 34a projecting upwardly through a slot 40 in the top of the housing element 18. Similarly, the metal anode 36 has a tab 36b projecting upwardly through a slot 42 in the top of the same housing element. In the assembled cell, a suitable sealing material is applied to close the slots around the tabs, and lead wires (not shown) are respectively secured to the exposed tab extremities above the housing element. For convenience and economy of manufacture, the metal anodes may be cut or punched in succession from an extended body of aluminum plate, with the tab 36b of each anode cut out of the body of the anode ahead of it, leaving a vertical notch 36c in the lower portion of the anode body.

The dimension and disposition of the opening 28, air cathode 34, metal anode 36 and luglike projections 38 in each cell are chosen such that the lower edges of the cathode and anode are spaced substantially above the floor of the chamber 22. Consequently, each chamber 22 includes a cavity or reservoir portion 22a of substantial volume entirely below the cell electrodes, extending directly beneath the anode-cathode gap of the cell as well as outwardly thereof. This reservoir portion, at least equal in horizontal cross-sectional area to the upper (electrode-containing) portion of the chamber, has a vertical extent (below the electrodes) that may be as much as one-third, or even more, of the entire vertical extent of the chamber.

The cap member 12 is a unitary, integral, molded plastic body, disposed above and extending entirely over the tops of the two cell housing elements 18 in the assembled device 10, thereby to enclose the tabs 34a, 36b and associated lead wires of both cells. Lateral flange portions 12a of the cap member respectively extend outwardly of, and in contiguous parallel relation to, the top portions of the seams 20 of the two cells, and are adhered thereto, while end flange portions 12b of the cap member substantially complete the enclosure of the electrode tabs and lead wires.

Before the cap member is bonded to the cells 11a and 11b, the lead wires are connected between the cells and to terminals (not shown, but disposed within, i.e. under, the cap member) of a light source mounted in the cap member seat 14, so as to connect the cells and light source in a series circuit. These electrical connections are isolated from the cell interiors by the abovedescribed sealing of the slots 40 and 42 and are protected by the cap member when the latter is adhered to and over the cells 11a and 11b. The light source is supported by and projects above the cap mount 14 to provide desired illumination.

In use, the device 10 may be activated by filling the chambers 22 of the two cells with salt water (e.g. sea water) or other appropriate electrolyte through the ports 16a, which are then closed; alternatively, if the device is provided with a switch (not shown) in the aforementioned circuit, it may be prefilled with electrolyte and turned on by operation of the switch. Assuming proper selection and configuration of the light source, and appropriate dimensioning of the cells and their electrodes (all matters readily within the ordinary skill of the art, given the foregoing description), a barge light designed to meet Coast Guard standards and having an advantageously long service lifetime is thereby provided. Reaction product such as aluminum hydroxide, formed in the anode-cathode gaps of the cells, passes downwardly from that gap and from the anode slots into the cavity or reservoir portion 22a of each cell chamber; the capacity of these cavities is such as to enable extended operation before the accumulating reaction product significantly interferes with cell operation. Air flows through the common lateral passage 32 defined between the cells, to permeate the air cathodes as required for the cells to operate, but because this passage is laterally confined between the two cells, the flow of air is limited or controlled, as desired to minimize evaporation losses of the liquid electrolyte in the cells. The device is simple and inexpensive yet sturdy and reliable in construction, and is easy to manufacture, assemble and use.

It is to be understood that the invention is not limited to the features and embodiments hereinabove specifically set forth but may be carried out in other ways without departure from its spirit.

What is claimed is:

1. A battery powered light source comprising:
   (a) an electric light bulb;
   (b) a plurality of air cathodes;
   (c) a plurality of metal anodes, one for each cathode;
   (d) a plurality of electrically nonconductive housings disposed adjacent to each other;
   (e) wherein each housing encloses a respective chamber for holding liquid electrolyte, said chamber containing one cathode and one anode which are spaced from each other and form an anode-cathode pair, for electrolytic reaction with said electrolyte producing an insoluble reaction product, the chamber in each said housing further defining a cavity below the anode-cathode pair and in fluid flow communication with the chamber for collecting said reaction product, and the housings being connected to form at least one air passage connected exteriorly with the atmosphere and extending from one side of said housing to the opposite side, and an opening in a side of each housing through which a surface of the cathode contained in the housing is exposed to air in said passage.

2. A battery powered light source as in claim 1, wherein the bulb is a fluorescent, strobe, flash light or incandescent bulb.

3. A battery powered light source as in claim 1, including a cover surrounding the bulb to direct light from the light source in a generally horizontal direction.

4. A battery powered light source as in claim 1, wherein the air cathode is formed using a porous carbon plate.

5. A battery powered light source as in claim 1, wherein said metal is selected from the class consisting of aluminum, magnesium, and alloys thereof.

6. A battery powered light source as in claim 1, wherein the metal anode is a plate having one or more slots.

7. A battery powered light source as in claim 1, wherein the anode and the cathode of each pair are separated by a distance of about one-sixteenth inch to about two inches apart.

8. A battery powered light source as in claim 1, including means formed in each said housing for supporting the contained anode entirely above said cavity.

9. A battery powered light source as in claim 1, wherein said anode and cathode cooperatively define a gap opening directly downwardly into said cavity.

10. A battery powered light source as in claim 1, wherein the liquid electrolyte is water containing an additive to enhance electrical conductivity.

11. A battery powered light source as in claim 10, wherein the additive is sodium chloride, potassium chloride, ammonium chloride, sodium hydroxide, potassium hydroxide or ammonium hydroxide.

12. A battery powered light source as in claim 10, wherein the additive is sodium chloride.

13. A battery powered light source as in claim 1, in which each housing has a vertical wall having an interior side and means to support each anode in its respective chamber comprising one or more platforms which project from said interior side of the vertical wall of the housing and form flat horizontal surfaces on which the anode rests.

14. A battery powered light source as in claim 1, wherein each electrically nonconductive housing comprises two electrically nonconductive shells having vertical edges joined to form a vertical seam.

15. A battery powered light source comprising:
(a) two air cathodes;
(b) two metal anodes, one for each cathode;
(c) two electrically nonconductive housings disposed adjacent to each other;
(d) wherein each housing encloses a respective chamber for holding liquid electrolyte, said chamber containing one of the cathodes and one of the anodes spaced from each other and forming an anode-cathode pair for electrolytic reaction with said electrolyte producing an insoluble reaction product, said chamber including a cavity below the anode-cathode pair for collecting said reaction product, said housings being connected together to form an external air passage extending from one side of said housing to an opposite side; each housing having an opening, facing said passage through which a surface of the contained cathode is exposed to air in said passage.

* * * * *